(12) United States Patent
Catoen et al.

(10) Patent No.: US 6,220,850 B1
(45) Date of Patent: Apr. 24, 2001

(54) MOLD GATE INSERT

(75) Inventors: Bruce Catoen, Georgetown; Roberto D. Sicilia, Mississauga; Janet Lee, Toronto, all of (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/250,415

(22) Filed: Feb. 16, 1999

(51) Int. Cl.⁷ ................................................ B29C 45/23
(52) U.S. Cl. .................. 425/549; 264/328.16; 425/562; 425/564
(58) Field of Search ................................ 425/549, 562, 425/563, 564, 565, 566; 264/328.15

(56) References Cited

U.S. PATENT DOCUMENTS 5,695,793 * 12/1997 Bauer ..................................... 425/564
5,716,651 * 2/1998 McGrevy ............................. 425/549

* cited by examiner

*Primary Examiner*—Tim Heitbrink
(74) *Attorney, Agent, or Firm*—Eric C. Spencer

(57) ABSTRACT

An injection molding machine, and stack assembly, employing a novel mold gate insert that can decrease the cycle time of the machine, and crystallinity and other defects in the mold gate area of plastic articles. A mold gate insert is described that is formed in two pieces. A first portion of the insert can forms a gate land for valve gated machines, and can thermally shield the nozzle tip. This first portion is made of a wear resistant material having a relatively low thermal conductivity, such as H13 tool steel. A second portion of the insert forms a section of the mold cavity and is made of a relatively highly thermally conductive material, such as beryllium copper. During the cooling phase of the injection cycle, the second portion provides rapid dissipation of heat to cool the section of the mold cavity, while the first portion creates a thermal barrier to shield the nozzle tip from the cooling of the second portion.

26 Claims, 4 Drawing Sheets

MOLD GATE INSERT

FIELD OF THE INVENTION

The present invention relates to injection molding. More particularly, the present invention relates to a gate insert for an injection mold, and an injection molding machine employing such an insert.

BACKGROUND OF THE INVENTION

Injection molding machines are well known and commonly used to produce a wide variety of plastic articles. Generally, a material, such as a plastic resin in the form of pellets, is fed to the machine through a hopper, and thence to a plasticizer where it is melted. The molten resin then flows under pressure to a nozzle, is injected through a gate into a mold cavity, cooled to its "freezing" temperature, and ejected from the mold cavity to complete a single molding cycle.

One area in which improvements can be made in the injection molding field is reducing the cycle time, thereby increasing the number of articles that can be produced by a machine. The cycle time for an injection molding machine is determined by a number of interdependent factors, including the physical and chemical attributes of the resin, the size of the molded article, and the time the article cools in the mold before it is ejected.

As is apparent, reducing the time needed to cool the article in the mold will reduce the overall cycle time. However, undesirable physical defects often result from attempts to reduce the cooling time, particularly in articles, such as preforms, made from polyethylene teraphthalate (PET). The most common of these undesirable characteristics are gate defects that occur in that portion of the preform in the vicinity of the gate. These common defects include crystalline halos and plugs, gate voids, internal dimples, scarred gates, and sticky or stringy gates. Many variables affect the quality of the gate area in a finished preform. Processing parameters, such as mold gate timing, nozzle tip temperature, and the flow rate of cooling fluid can all be adjusted to improve preform quality. However, insufficiently rapid heat transfer at the gate area remains one of the most persistent difficulties to overcome, and a continuing obstacle to greatly improved cycle times.

In a typical hot runner injection molding system with valve gating, insufficient cooling in the gate area can be attributed to the several competing functions of the gate area, and the cyclic temperature swings to which it is subject. The gate is a passage, generally a tapered hole formed in gate insert that directs the flow of molten resin from the nozzle to the mold cavity. The mold gate insert acts as a locator for the nozzle tip on one side, and forms part of the mold cavity at its other side. Its nozzle side is subject to a constant high nozzle tip temperature that can be undesirably transferred through the insert to the mold cavity. Meanwhile, the mold cavity side of the gate insert must quickly cycle between a high temperature when the gate is open to a low temperature sufficient to freeze the resin when the mold has been filled and the gate closed.

Further, in valve gating, the opening and closing of the gate is achieved mechanically with a valve stem. This stem can be moved between an open position, permitting the flow of molten material through the gate, and a closed position where the valve stem seats in the gate thereby forming a seal and preventing molten material from passing through the gate. One disadvantage of valve gating is that the valve stem is in close proximity to the nozzle assembly. As a result, the valve stem tends to be very hot in comparison to the gate area of the mold, which can effect the quality of the sprue gate formed on a molded article. Undesirable properties such as crystalline sprues, and other defects, can result. Another disadvantage of valve gating is caused by the cyclic opening and closing of the gate which subjects the seating area, or gate land, to heavy wear by the valve stem.

To overcome some of the disadvantages of valve gating, in thermal gating the valve stem is eliminated. The gate is opened and closed by temperature cycling at the nozzle to freeze or heat the material in the gate area. However, the gate area is still subject to cyclic heating and cooling, and thermal isolation of the nozzle from the mold is a concern.

To provide acceptable thermal isolation of the mold cavity from the high nozzle tip temperatures, and wear resistance in the gate land, prior art gate inserts have generally had to compromise on the thermal conductivity, and hence the speed of heat transfer, of the gate insert material.

Several prior art references disclose thermal shielding at the nozzle tip to limit cooling of the hot runner nozzle tip in the vicinity of the mold gate area. For example, U.S. Pat. No. 3,741,704 to Beasley discloses a thermally insulating sleeve, made of a material such as asbestos, attached to the upper surface of the mold die. The sleeve prevents loss of heat from the hot nozzle tip to the cooler mold die, and is intended to prevent resin freeze up at the gate. Such an insulating sleeve can deteriorate due to wear caused by the valve stem and the passage of abrasive or corrosive molten materials. U.S. Pat. No. 4,268,240 to Rees et al. discloses a thermally insulating sheath formed by a plug of cold resin either before or during the molding process. Cleaning and maintenance, and changing resin properties are all adversely affected by such a means of thermal insulation of the nozzle tip.

U.S. Pat. No. 4,416,608 to Deardurff discloses several ways to thermally insulate a hot runner nozzle housing from a cooler mold. Deardurff discusses the formation of an air gap around the nozzle, providing an angle at the bottom portion of the nozzle housing to limit the contact between the nozzle and the mold, and providing a nozzle housing having at the tip a bottom portion having a rough surface in contact with the mold. Generally, Deardurff has limited application as it does not provide any sealing means at the gate area. Also, because of the direct contact between the nozzle tip and the mold gate area the gate cannot be efficiently thermally insulated, and crystallinity penetration at the sprue gate portion of PET preforms can occur during cooling of the cavity.

Reference is also made to U.S. Pat. No. 4,622,001 to Bright, which discloses a mold with water cooling channels at the mold gate. The channels are formed between a cap member attached between the nozzle tip and the mold cavity member. While the cooling taught in Bright can improve the cooling in the gate area of a molded article, it is apparent that it can cause undesirable cooling of the nozzle tip.

Some of the disadvantages of prior art nozzle tip insulation, as described above, includes the relative complexity of the various insulating sheaths, caps and sleeves. They are generally not resistant to either chemical or physical wear, and their replacement involves substantial disassembly and down time of the associated injection molding machinery. One solution has been to use mold gate inserts that can be more easily replaced when necessary. Mold gate inserts are well known in the art, as shown for example in U.S. Pat. No. 4,911,636 to Gellert and U.S. Pat. No. 5,652,003 to Gellert. The inserts form the upper portion of the mold cavity, and provide a seat for the nozzle tip. While providing some thermal shielding to the nozzle tip, these gate inserts are still subject to high nozzle tip temperatures and can still result in insufficiently rapid cooling of the mold gate area of a molded article, and result in defects as enumerated above.

It is therefore desirable to provide a novel gate insert that can be manufactured from materials with high thermal conductivity to permit more efficient heat transfer and reduced cooling time, without sacrificing wear resistance and thermal isolation from nozzle tip temperatures.

SUMMARY OF THE INVENTION

It is an object of the present invention to provide a novel injection molding machine that obviates or mitigates the disadvantages of the prior art.

It is a particular object of the present invention to provide a novel injection mold that has a reduced overall cycle time in comparison to the prior art machines, and a molding method that reduces cycle time.

It is a further object of the present invention to provide a novel mold assembly for an injection molding machine that obviates or mitigates the disadvantages of the prior art.

It is still a further object of the present invention to provide a novel mold gate insert that obviates or mitigates the disadvantages of the prior art.

In a first aspect of the present invention, there is provided an injection molding machine employing a novel mold gate insert that can decrease the cycle time for the machine. The injection molding machine has multiple mold cavities, each of which is served by a separate nozzle assembly conveying molten plastic resin to a nozzle tip for injection into its respective mold cavity. In a single injection cycle, the gates to each mold cavity are opened to permit the resin to flow into the mold cavity. When the cavity is filled, the gates are closed, thereby stopping the flow of resin to the cavity. The mold cavity is then cooled to freeze the resin and a finished plastic article is ejected. The gate is a passage formed in a two piece mold gate insert.

A first portion of the insert forms the gate land and thermally shields the nozzle tip. This first portion is made of a wear resistant material having a relatively low thermal conductivity. A second portion of the insert forms a section of the mold cavity and is made of a relatively highly thermally conductive material. During the cooling phase of the injection cycle, the second portion provides rapid dissipation of heat to cool the section of the mold cavity, while the first portion creates a thermal barrier to shield the nozzle tip from the cooling of the second portion.

In a further aspect of the present invention, there is provided a mold assembly for an injection molding machine, including a novel mold gate insert. The mold assembly has a mold cavity and a mold core that cooperate to form a molded plastic article when molten plastic resin is injected into the mold cavity during an injection cycle. A gate permits the resin to flow into the mold cavity from the nozzle tip of a nozzle assembly. The gate is formed in a two piece mold gate insert. A first portion is made of a wear resistant material with a relatively low thermal conductivity. A second portion of the gate insert is made of a material having a relatively high thermal conductivity that forms a section of the mold cavity. The second portion permits heat to be rapidly removed from the section during the cooling phase of the injection cycle, while the first portion simultaneously shields the nozzle tip from the cooling effect. A conventional stripping means is then provided to strip the cooled molded article from the mold cavity.

In a yet another aspect of the present invention there is provided a novel mold gate insert for an mold gated injection molding machine. The mold gate insert has a passage forming a gate in the insert. The gate permits communication between a nozzle assembly and a mold cavity in the injection molding machine. The mold gate insert is of two piece construction. A first portion is made of a wear resistant material, having a relatively low thermal conductivity, that permits repeated seating of the valve stem over multiple injection cycles. A second portion of the insert forms a section of a mold cavity, and is made from a relatively highly thermally conductive material. The second portion rapidly dissipates heat during a cooling phase of each injection cycle, while the first portion thermally isolates the a nozzle tip of the nozzle assembly.

In one embodiment of the present invention, the wear resistant material forming the first portion of the mold gate insert is H13 tool steel. The second portion of the insert is formed of beryllium copper.

In a further embodiment of the present invention, the first portion creates a land area to provide a seat for a valve stem in the gate.

In a further embodiment of the present invention, the second portion of the mold gate insert is provided with cooling channels in which a cooling fluid circulates to enhance the cooling of the mold cavity section.

The mold gate insert of the present invention can be formed by press fitting the first portion into the second portion. Alternatively, the first portion can be swaged to the second portion.

In further aspects of the present invention, there are provided a method for reducing crystallinity in molded articles formed of crystalline resins, and a method for reducing cycle time in an injection molding process. These methods involve conveying a molten resin, such as PET, to a nozzle tip in an injection molding machine. A gate, formed in a mold gate insert and leading to an mold cavity, is opened to permit the molten resin to flow into the mold cavity. The molten resin is injected through the nozzle tip into the mold cavity, while the nozzle tip is maintained at an optimum temperature by a first portion of the insert. The first portion is formed of a wear resistant material having a relatively low thermal conductivity, such as H13 tool steel. The gate is then closed to stop the flow of resin, and the mold cavity is cooled to freeze the resin. Meanwhile, a second portion of the insert, forming a section of the mold cavity, rapidly conducts heat from the cavity through. The steps are repeated in each cycle, or to form each set of articles.

BRIEF DESCRIPTION OF THE DRAWINGS

Preferred embodiments of the present invention will now be described, by way of example only, with reference to the attached Figures, in which.

DETAILED DESCRIPTION

Figure 1:
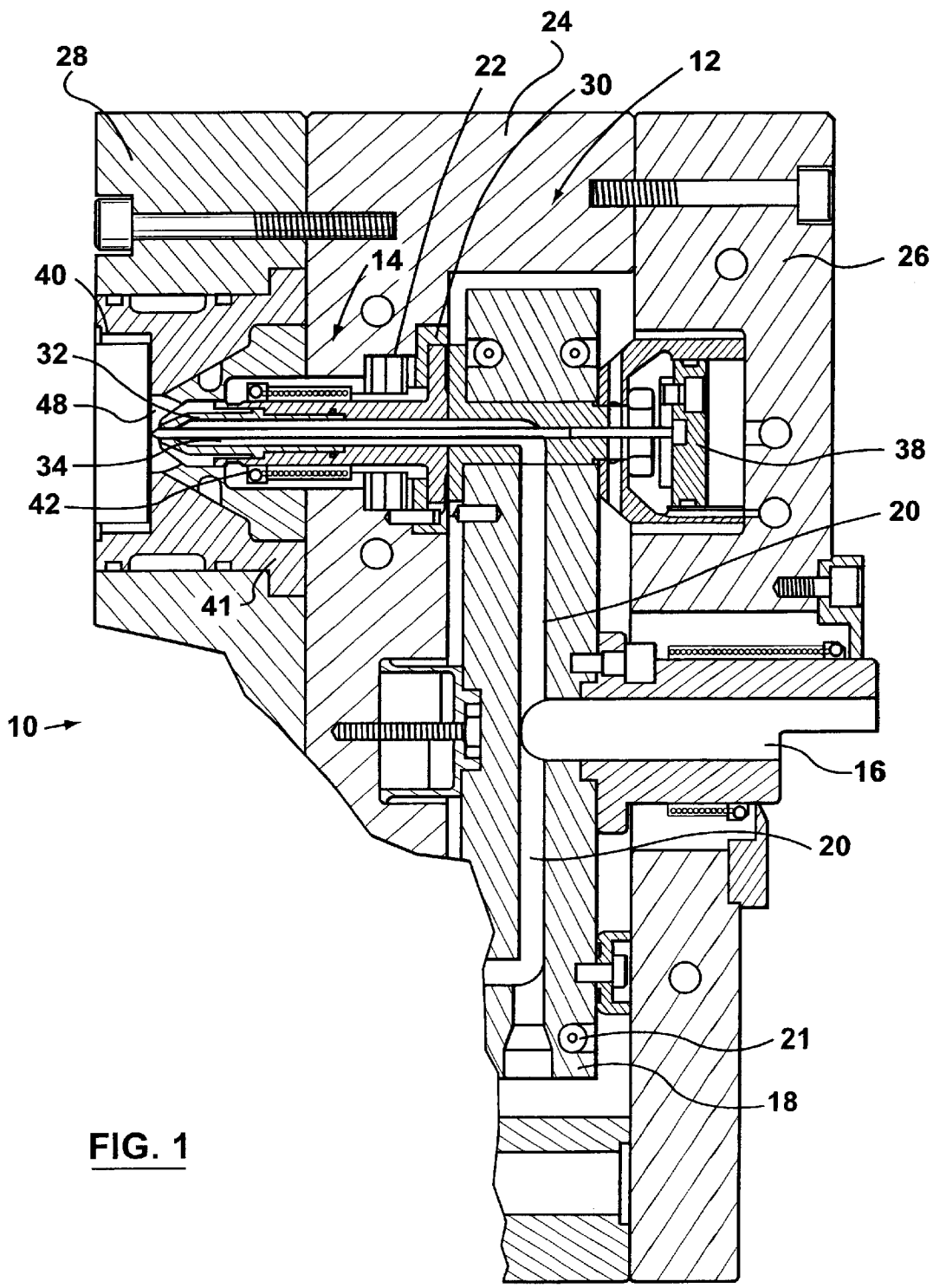
FIG. 1 is a cross sectional view of a portion of a hot runner system of an injection molding machine.

FIG. 1 shows a cross section of portion of a multi-cavity injection molding machine, generally designated as 10, including a hot runner system 12. Hot runner system 12 provides molten plastic resin to a plurality of mold gated nozzle assemblies, one of which is shown and generally designated as 14. It is contemplated that the present invention is particularly suited to injection molding machines that produce polyethylene teraphthalate (PET) preforms. As is well understood by those of skill in the art, PET is especially sensitive to uneven cooling effects that can result in crystallinity and other physical defects. However, the present invention is not limited to an injection molding machine as shown in the Figures. Particularly, while the present invention will be described with reference to a valve gated machine 10, it is in no way limited to such machines and is equally applicable to thermal gated machines that employ mold gate inserts, as will be apparent to those of skill in the art.

Molten plastic resin is supplied to hot runner system 12 from a resin source, typically a hopper feeding resin pellets to a plasticizer (not shown) and thence to a main melt channel 16. Main melt channel 16 conveys the now molten resin to a manifold 18. As is well known, manifold 18 has a number of manifold melt channels 20 through which the molten resin travels to nozzle assemblies 14 while it is maintained at an optimum processing temperature by manifold heaters 21.

Nozzle assembly 14 is positioned within a bore 22 provided in a manifold plate 24, sandwiched between a manifold backing plate 26 and a cavity plate 28. Nozzle assembly 14 generally includes a nozzle housing 30 in which is held a nozzle tip 32 through which runs a nozzle channel 34 communicating with manifold melt channel 20. A valve stem 36 is located within channel 34 and can be reciprocated by a piston 38 between an opened and a closed position. In the open position, the resin flow into a mold cavity 40 formed in a cavity member 41 located in cavity plate 28. In the closed position, as shown, the valve stem is forced against a gate 44 to restrict the flow of resin from the nozzle tip 32 and prevent the flow of resin into the mold cavity 40. A nozzle heater band 42 maintains nozzle tip 32 at a relatively high temperature determined by the resin being injected. For example, in an injection molding machine for molding polyethylene teraphthalate (PET) preforms, the nozzle tip temperature is typically in the range of about 280° C. to 320° C.

Figure 2:
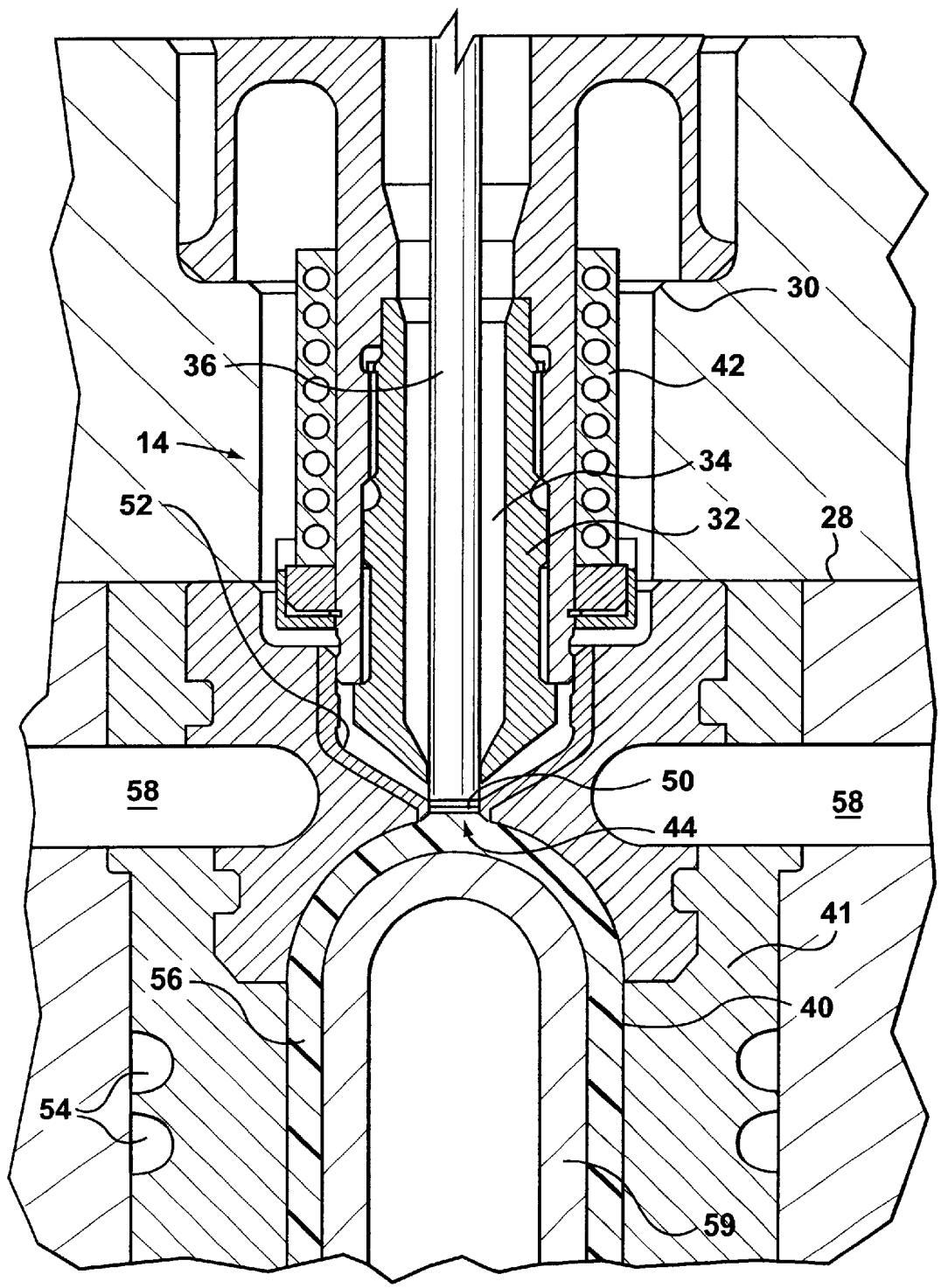
FIG. 2 is a cross sectional view of a mold gate area of an injection molding machine, in accordance with the present invention.

Referring to FIG. 2, a cross section of a portion of injection molding machine 10 surrounding nozzle assembly 14 is shown. Nozzle assembly 14 is shown in a closed position, with valve stem 36 seated in gate 44, thereby sealing gate 44 and preventing the flow of resin into mold cavity 40. Gate 44 is a passage that provides an entry point for the molten resin in a mold. Where it is desired to employ mechanical valve gating to control the flow of resin into the mold cavity 40, gate 44 is generally formed in a mold gate insert 48 that can be replaced when worn by repeated opening and closing of the gate 44. This wear occurs particularly in a gate land area 50 where the tip of valve stem 36 seats in the closed position, as shown. Gate land 50 is a generally tapered section of gate 44 that is complementary to the tapered tip of the valve stem 36. The gate insert 48 can also be worn by the corrosive effects of certain molten resins. This corrosive wear occurs particularly in the region 52 surrounding the nozzle tip 32, where molten resin collects during operation of machine 10.

Means for cooling, such as cooling channels 54, are typically provided in a cavity member 41 to cool the resin injected into cavity 40 and form an article 56, such as a preform. In the illustrated embodiment, a cooling fluid, such as water, is circulated through the cooling channels 54 during a cooling phase of an injection cycle, as will be further described below. Typically, gate insert 48 is also provided with cooling means, such as cooling channels 58, through which a cooling fluid can also circulate. As is well known to those of skill in the art, further cooling of the article 56 is generally provided within a core 59 forming the interior surface of mold cavity 40.

Figure 3:
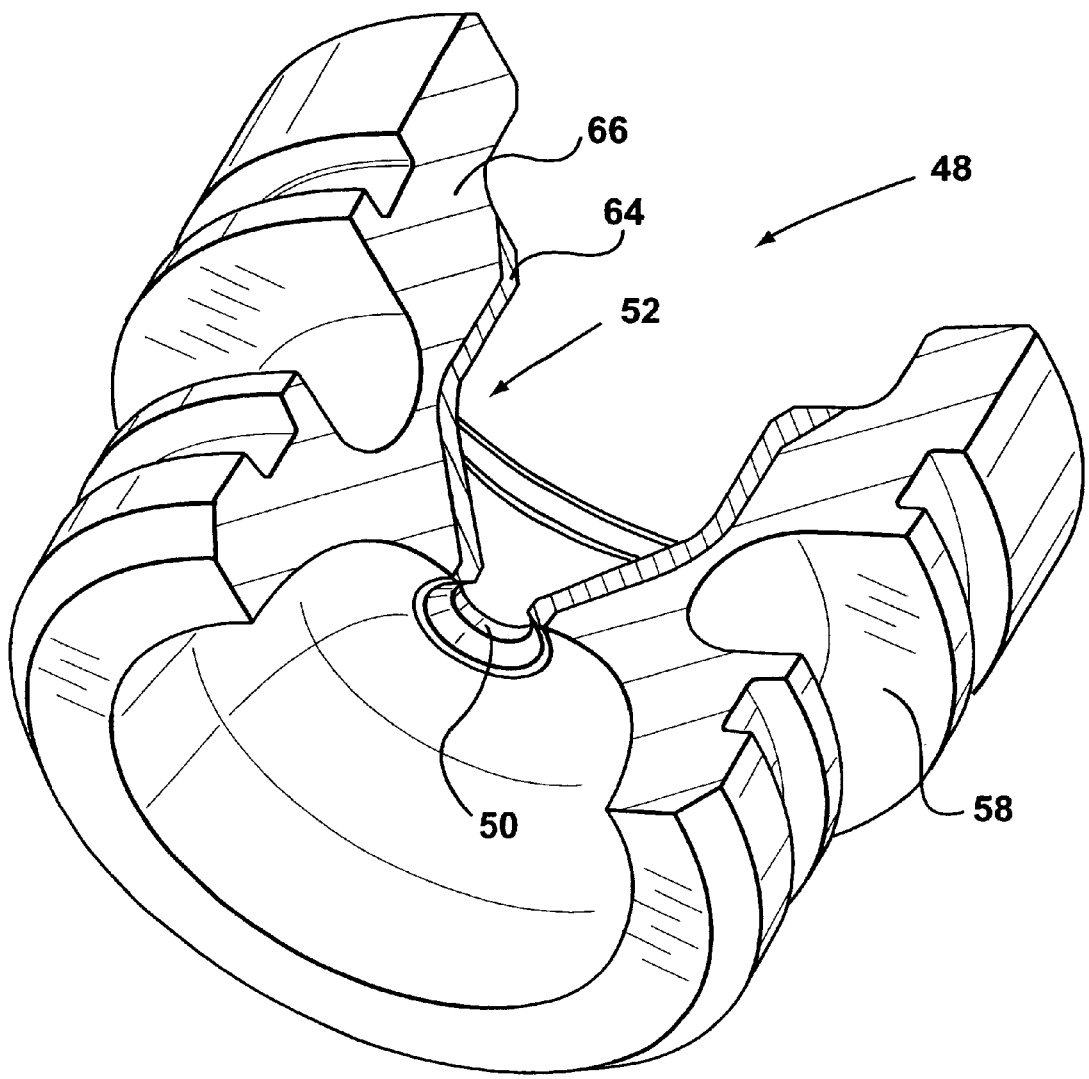
FIG. 3 is a perspective view, partially cut away, of a mold gate insert as shown in FIG. 2.

The construction of mold gate insert 48 will be more particularly described with reference to FIGS. 2 and 3. Gate insert 48 is of generally two piece construction, having a first portion 64 and a second portion 66. First portion 64 generally lines the region 52 surrounding the nozzle tip 32 and forms the gate land area 50 in a valve gated machine. Second portion 66 forms a section 68 of mold cavity 40 adjacent nozzle tip 32. Due to the wear conditions described above, first portion 64 is made of a wear resistant material. As used herein, wear resistance includes both resistance to mechanical and corrosive wear. In order to maintain the nozzle tip at its optimum operating temperature, the material forming first portion 64 also has a relatively low thermal conductivity, such that it is affected as little as possible by temperature cycling in the mold cavity 40.

In a presently preferred embodiment for an insert 48 to be used in the production of PET preforms, H13 tool steel has been found to have the desired properties of wear resistance and relatively low thermal conductivity. H13 has a hardness measured on the Rockwell scale of in the range of approximately 42–44 Rockwell C at 20° C., and a thermal conductivity of approximately 26.5 W/M ° C. at 400° C. Other materials that may be suitable are 420 ESR steel having a hardness in the range of approximately 49–51 Rockwell C at 20° C., and a thermal conductivity of approximately 24.9 W/M ° C. at 400° C; and Vespel having a hardness of in the range of approximately 45–60 Rockwell E at 20° C., and a thermal conductivity of approximately 26.5 W/M ° C. at 400° C. It is also contemplated that other materials having similar characteristics can be used, and, as will be apparent, the particular properties of the material chosen for first portion 64 are determined by the resin being molded in machine 10, the temperature at which it is processed, and the size and shape of the article produced.

Second portion 66 is formed of a material having a relatively high thermal conductivity. A presently preferred material is beryllium copper ($BeCu_{25}$). Beryllium copper has a thermal conductivity in the range of 103.9 W/M ° C. at 400° C. And, because during maintenance technicians may have to chip frozen plastic from the molding surface in the section 68, it is preferable for second portion 66 to be made from a material chosen with a hardness able to withstand such servicing. Beryllium copper can be prehardened to a hardness in the range of approximately 38–41 Rockwell C at 20° C., which has been found sufficient to withstand servicing.

Presently, to assemble the gate insert 48, the first portion 64 and second portion 66 are machined to within standard tolerances and press fit together. It is fully within the scope of the present invention that the two pieces can be cast, and it is also contemplated that the portion 64 and second portion 66 can be swaged together.

Figure 4:
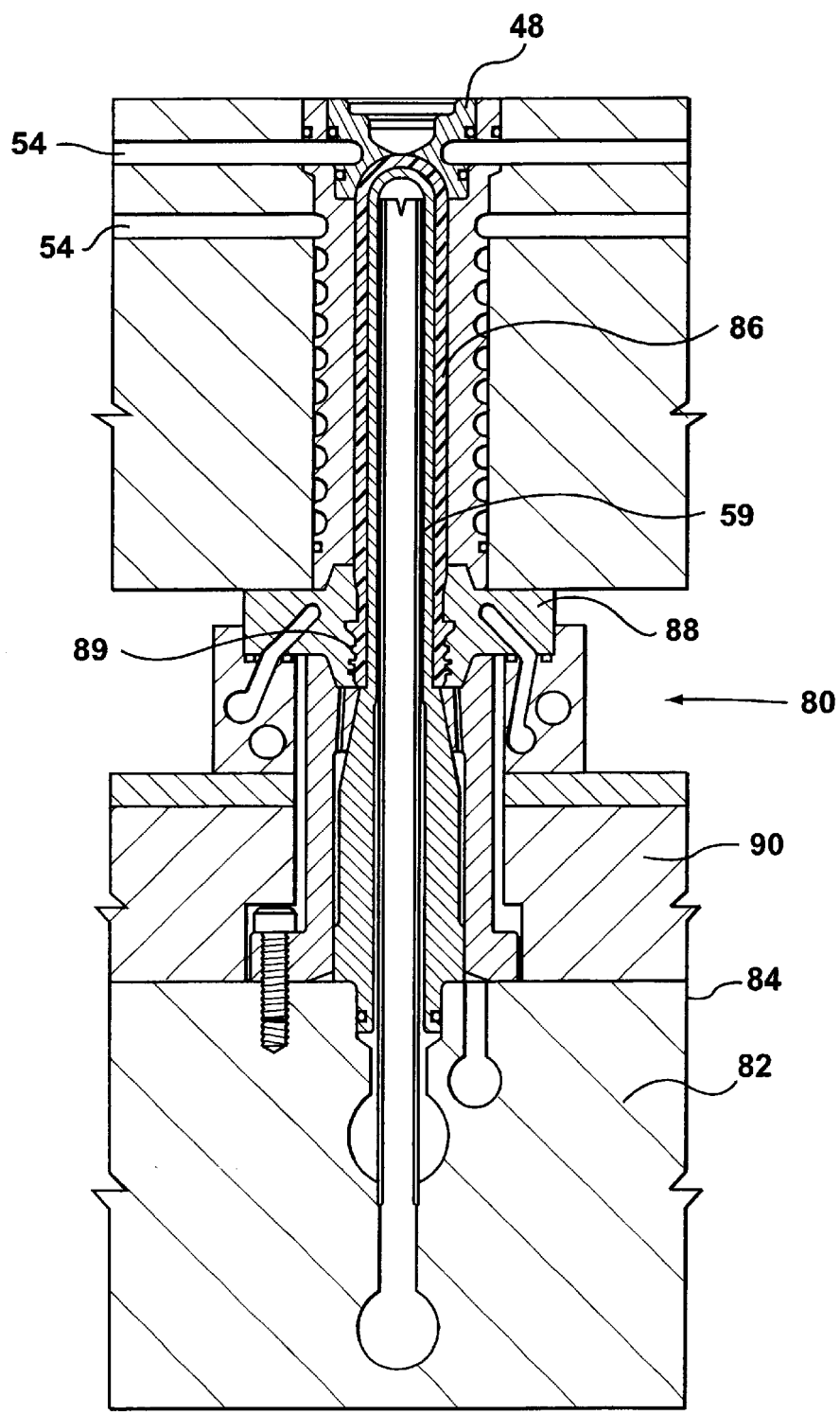
FIG. 4 is a cross sectional view of a mold assembly, in accordance with the present invention.

Generally, the gate insert of the present invention will form part of a mold assembly 80, as shown in FIG. 4. The mold assembly 80 generally consists of mold cavity member 41 and mold core 59 cooperating to form mold cavity 40. Core 59 is mounted within a core plate 82 and is provided with a cooling tube 84 to cool the interior surface of a preform 86. Gate insert 48 forms section 68 of mold cavity 40. Gate 44 provides a passage for the flow of the resin into the cavity 40. Mold assembly 80 further includes a neck ring 88 that forms the threaded portion 89 of preform 86, and some means to strip finished frozen preform 86 from the mold cavity 40. In the illustrated embodiment, stripping is achieved by a stripper plate 90 attached to neck ring 88. As the mold opens, stripper plate 90 moves away from the mold, retaining preform 86 within neck ring 88 from whence it can be ejected from machine 10.

The operation of the present invention will now be described over the course of an injection cycle, with reference to FIGS. 1–4. In a typical injection cycle, valve stem 36 is retracted by piston 38 to open gate 44. Molten resin, fed by hot runner 12 to nozzle channel 34, and hence to nozzle tip 32, is conveyed under pressure to mold cavity 40 through gate 44. Throughout the cycle, nozzle tip 32 is heated by band heaters 42 to maintain resin in channel 34 at an optimum processing temperature, and not subject it to cyclic heating and cooling. As the molten resin is being conveyed into the mold cavity 40, the cooling means provided in the mold cavity member 41, and gate insert 48, are inactive thereby permitting the molten resin to fill the mold before beginning to freeze. Once the mold is full, valve stem 36 is advanced to seat in gate 44 to stop the flow of resin. Simultaneously, the cooling means are activated and the resin freezes to form preform 86. The mold opens, the stripping means strips the preform 86 from the mold, and ejects the finished preform from the machine 10. The mold then closes, and the cycle repeats.

During the cooling phase, when the cooling means are activated, the relatively low thermal conductivity of the first portion 64 of the insert 48 thermally shields the nozzle tip 32 from the cooling provided to the mold cavity 40. When the gate 44 is closed, the wear resistant properties of the first portion 64 prevent premature and unacceptable wear in the gate land area 50. Meanwhile, the relatively high thermal conductivity of the second portion 66 allows rapid cooling, when compared to the prior art, of section 68 of the mold cavity 40 during the cooling phase. Generally, the heat from section 68 is dissipated to the circulating cooling fluid in cooling channels 58 and to the cavity plate 28. The more rapid cooling of the section 68 permits the total cycle time to be reduced without producing preforms 86 with unacceptable defect levels.

Under test conditions, the assignee of the present invention, has observed significant improvements in cycle time. Testing was performed on a Husky LX 160 injection molding machine, using a 2 cavity 2 L preform mold fitted with a Husky Ultra Hotrunner. An embodiment of the gate insert 48 of the present invention, having an H13 first portion and a beryllium copper second portion as described above, was used. The gate insert 48 was tested under differing processing conditions and the resultant preforms were assessed quantitatively and qualitatively for part weight, gate vestige height, crystalline halo diameter, crystalline plug depth, voids and dimples, scars, and overall gate vestige quality. When the results were analyzed, a 2.4 s improvement in cycle time was observed for operation of the 2 cavity mold. Strong thermal isolation of the nozzle tip 32 was observed, and only 38% of the nozzle tip band heater output capacity was required to keep the nozzle tip 32 at its optimum operating temperature. Translating these results to production conditions on a standard 48 cavity Husky 48 SP molding machine, it is contemplated that up to a half second improvement in the cycle time for producing 2 L PET preforms can be achieved.

While the present invention has been described with particular reference to the molding of PET preforms, it will be apparent that the gate insert of the present invention can be adapted for any injection molding machine requiring a gate insert.

It will be apparent to those skilled in the art that the foregoing is by way of example only. Modifications, variations and alterations may be made to the described embodiments without departing from the scope of the invention which is defined solely in the claims.

We claim:

1. An injection molding machine having a plurality of mold cavities for forming a plurality of plastic articles during an injection cycle, comprising:
   a source of molten plastic resin;
   a plurality of nozzle assemblies, each said nozzle assembly having a channel for conveying said molten resin to a heated nozzle tip,
   a mold gate insert adjacent each said nozzle assembly, said mold gate insert permitting communication between said nozzle assembly and its respective mold cavity, said mold gate insert having a first portion formed of a wear resistant material having a relatively low thermal conductivity to provide thermal insulation of said nozzle tip, and a second portion forming a section of said mold cavity extending beyond said mold gate, said second portion formed of a material having a second thermal conductivity for rapidly cooling said section during a cooling phase of said injection cycle.

2. An injection molding machine according to claim 1, wherein a valve stem controls injection of said molten resin to a respective one of said mold cavities.

3. An injection molding machine according to claim 2, wherein said first portion forms a land area for seating said valve stem.

4. An injection molding machine according to claim 1, wherein said source of molten resin includes a hot runner system.

5. An injection molding machine according to claim 1, wherein said first portion is formed of H13 tool steel.

6. An injection molding machine according to claim 1, wherein said second portion is formed of beryllium copper.

7. An injection molding machine according to claim 1, wherein said first portion is press fit into said second portion.

8. An injection molding machine according to claim 1, wherein said first portion is swaged to said second portion.

9. An injection molding machine according to claim 1, wherein said mold gate insert is provided with cooling means.

10. An injection molding machine according to claim 9, wherein said cooling means are cooling channels provided with a circulating cooling fluid.

11. A mold assembly for an injection molding machine, comprising:
   a mold cavity;
   a mold core cooperating with said mold cavity to form a molded plastic article from molten plastic resin injected into said mold cavity during an injection cycle;
   a gate for permitting flow of said resin from a nozzle tip into said mold cavity, said gate formed in a mold gate insert having a first portion formed of a wear resistant material having a first thermal conductivity to provide thermal insulation to said nozzle tip, and a second portion formed of a material having a second thermal conductivity higher than said first thermal conductivity, said second portion forming a section of said mold cavity extending beyond said mold gate and rapidly dissipating heat during a cooling phase of said injection cycle; and stripping means for stripping said molded article from said mold cavity after said cooling phase.

12. A mold assembly according to claim 11, wherein said first portion forms a land area for seating a valve stem.

13. A mold assembly according to claim 11, wherein said first portion is formed of H13 tool steel.

14. A mold assembly according to claim 11, wherein said second portion is formed of beryllium copper.

15. A mold assembly according to claim 11, wherein said first portion is press fit into said second portion.

16. A mold assembly according to claim 11, wherein said first portion is swaged to said second portion.

17. A mold assembly according to claim 11, wherein said mold gate insert is provided with cooling means.

18. A mold assembly according to claim 17, wherein said cooling means are cooling channels provided with a circulating cooling fluid.

19. A mold gate insert for an injection molding machine, comprising:

a gate for communicating between a nozzle assembly and a mold cavity;

a first portion formed of a wear resistant material having a first thermal conductivity, said first portion providing thermal insulation to said nozzle assembly;

a second portion formed of a material having a second thermal conductivity higher than said first thermal conductivity, said second portion forming a section of a mold cavity extending beyond said gate and rapidly dissipating heat during a cooling phase of an injection cycle.

20. A mold gate insert according to claim 19, wherein said first portion forms a forms a land area for seating a valve stem.

21. A mold gate insert according to claim 20, wherein said first portion is formed of H13 tool steel.

22. A mold gate insert according to claim 20, wherein said second portion is formed of beryllium copper.

23. A mold gate insert according to claim 20, wherein said first portion is press fit into said second portion.

24. A mold gate insert according to claim 20, wherein said first portion is swaged to said second portion.

25. A mold gate insert according to claim 24, wherein said mold gate insert is provided with cooling means.

26. A mold gate insert according to claim 25, wherein said cooling means are cooling channels provided with a circulating cooling fluid.

* * * * *